United States Patent [19]

Dougal

[11] Patent Number: 5,147,531
[45] Date of Patent: Sep. 15, 1992

[54] SALT LEVEL MONITORING DEVICE FOR WATER SOFTENERS

[76] Inventor: Stephen W. Dougal, 8250 Ustick Road, Boise, Id. 83704

[21] Appl. No.: 716,205

[22] Filed: Jun. 17, 1991

[51] Int. Cl.$^5$ .............................................. C02F 1/42
[52] U.S. Cl. .................................. 210/91; 200/61.21; 210/190; 340/617
[58] Field of Search ................ 200/61.21; 210/86, 91, 210/97, 190, 191; 340/617

[56] References Cited

U.S. PATENT DOCUMENTS

| | | |
|---|---|---|
| 3,102,175 | 8/1963 | Eichenberger ...................... 340/617 |
| 4,312,225 | 1/1982 | Williams ............................. 340/617 |
| 4,987,409 | 1/1991 | Jackson .............................. 73/308 |

*Primary Examiner*—Ivars Cintins
*Attorney, Agent, or Firm*—Paul F. Horton

[57] ABSTRACT

A salt level monitoring device for water softeners including a weight for placement upon the salt mass; a drop line connected to the weight at one end and a sensor at the opposing, upper end; and a support member for supporting the sensor and drop line over the salt mass. Once the salt mass drops to a selected level, tension is placed upon the drop line and hence the sensor causing actuation thereof to send forth either an aural or visual signal. The weight has a mass less than the mass of the salt but greater than the mass of brine to prevent the weight from becoming embedded in the salt mass and to prevent false signals. A clip attaches the drop line to the weight for convenient adjustment of the drop line depth so that the salt level may be monitored at selected heights within the softener.

6 Claims, 2 Drawing Sheets

SALT LEVEL MONITORING DEVICE FOR WATER SOFTENERS

BACKGROUND OF THE INVENTION

1. Field of the Invention

This invention relates to solid mass monitoring devices and, more particularly, to device for monitoring salt level within a water softener.

2. Description of the Prior Art

Because of the time lapse in needing to replenish water softeners with salt, the softeners are often not visually checked and the softener is depleted of its salt supply. In addition to the lack of soft water, damage may occur to the softener, hot water heater, and other appliances connected to the softener.

It is, therefore, highly desirable that the owner of the water softener be alerted to a low salt condition within the softener by a monitoring device. Such a monitor should be simple in construction; be easily installed without mutilation of the softener; be easy to operate; and be inexpensive.

Devices for detecting particulate matter levels include those of J. Rowan, U.S. Pat. No. 1,760,609; J. Geis, U.S. Pat. No. 3,114,804; J. Sinsky, U.S. Pat. No. 4,219,133; and D. Williams, U.S. Pat. No. 4,312,225. Rowan utilizes a drum-cable unit, the cable of which is lowered onto the mass and, in stopping at a given level, is monitored by a recording meter depending upon the amount of rotation of the drum. Geis utilizes a mercury switch, which, when tilted, records the level of a particulate mass. Sinsky measures the level much in the manner of Rowan, but utilizes a pulse generator controlled by the winch. Williams utilizes a thimble anchored or embedded in the particulate mass, which is attached to a cord suspended from either a balance arm or tension spring for actuation upon any change of tension.

The only device known for indicating salt level within a water softener is that of E. Eichenberger, Jr., U.S. Pat. No. 3,102,175. Eichenberger utilizes a plate, held down by the salt mass until the salt level falls below the position of the plate, at which time a spring is released to close a contact to operate a signalling device.

The Rowan, Geis, and Sinsky devices, in requiring controlled lowering of cables by winches, make the devices totally unsuitable for water softeners. The Williams device requires the anchorage or embedding of a thimble in the particulate mass. Any change in tension of the cord supporting the thimble will actuate the signalling system. Where the mass is salt, as in a water softener, any lowering of the entire salt mass, as caused by the salt going into a brine solution, would activate the Williams device, because of the lowering of the salt mass, making the Williams device unsuitable for monitoring salt level within water softeners.

The Eichenberger device also requires anchorage within the salt mass; is subject to the corrosive action of salt in that the entire device is within the mass; is not readily installable; causes mutilation of the tank holding the salt and brine; and is subject to damage and therefore incorrect monitoring in that the plate monitoring salt level is held outwardly into the salt mass by means of a cantilever spring.

SUMMARY OF THE INVENTION

The present invention overcomes these problems by providing a simple but effective device which requires no winches; which may be mounted within a water softener by means of an adjustable brace; which causes no mutilation to the salt and brine holding tank of the softener; which includes a weight which is non-buoyant in brine solution and yet is of such mass as to rest upon and not become embedded in the salt mass; and which includes a drop line readily attachable to a weight and which is readily adjustable to length so as to actuate a sensor at a precisely selected salt level within the water softener.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
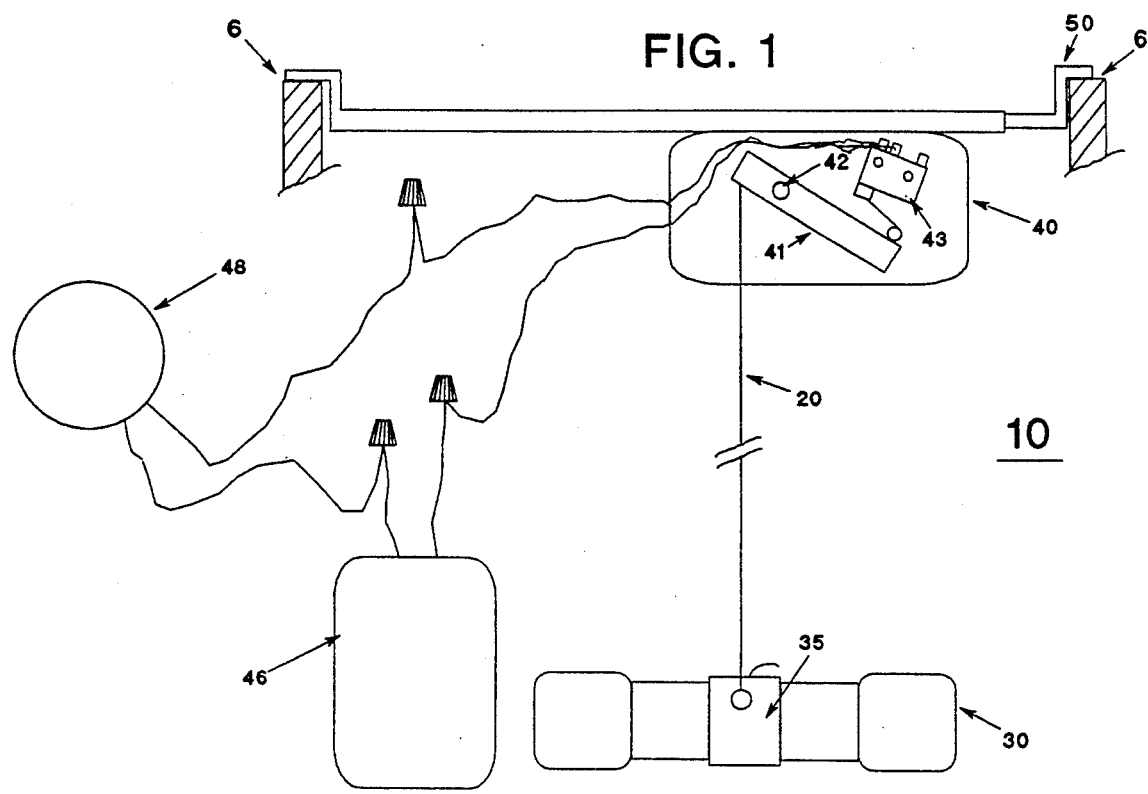
FIG. 1 is a diagrammatic view showing a preferred embodiment of the present invention.
Figure 2:
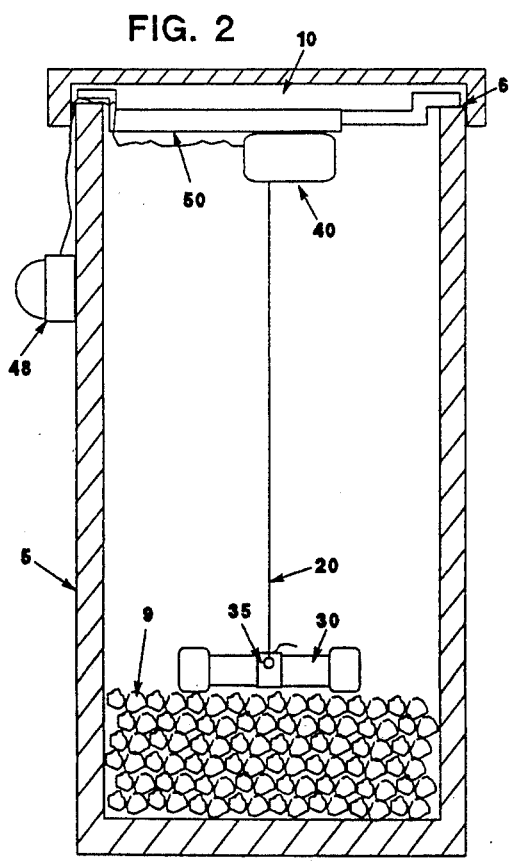
FIG. 2 is a side sectional view of the monitoring device of the present invention, shown attached to a water softener.

Referring now to the drawings and FIGS. 1 and 2, in particular, a preferred embodiment of a salt level monitoring device 10, made according to the present invention, is disclosed. Monitoring device 10 includes, generally, a drop line 20; a weight 30; a sensor 40; and sensor support mounting means 50.

Drop line 20 may be constructed of any non-corrosive substance, such as Nylon, and be of sufficient length to reach from sensor 40, to which it is attached, to a place adjacent the bottom of the water softener tank.

The drop line is connected at its lower end to weight 30, preferably by means of a line length adjustment clip 35. Clip 35 serves to clamp line 20 to the weight and permits a desired length of line to be pulled therethrough so that the weight is allowed to drop only a selected distance within the tank of the softener before actuation of the sensor. While clip 35 may be of any suitable construction, a simple, non-corrosive friction clamp is preferred. Weight 30 is constructed so as to have a mass density less than the mass of the salt but greater than the mass of brine. So constructed, the weight will sink within any brine and yet rest upon the top surface of the salt mass. It has been found that a tubular weight, circular in cross section, works well in providing sufficient surface area per unit weight to prevent the weight from becoming embedded in the salt.

Figure 6:
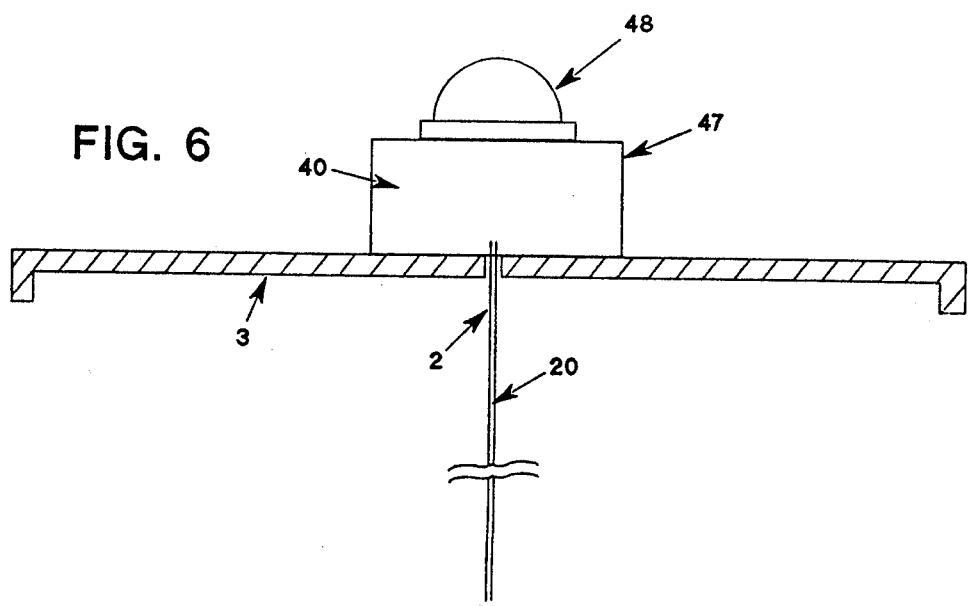
FIG. 6 shows a water softener lid with aperture, in cross section, for an alternate mounting of the device.

At its uppermost end, drop line 20 is connected to sensor 40. Sensor 40 preferably includes a weighted or spring biased lever 41 pivotal upon a pivot member 42 so as to actuate a microswitch 43 once sufficient tension is placed upon the drop line to cause pivoting of the lever. While the drop line could be connected directly to the microswitch, the lever acts as a buffer between the drop line and microswitch to prevent damage to the microswitch should excessive force be applied to the drop line. Sensor 40 also includes a signal device 48 which may be aural, such as a buzzer or bell, or, as is preferred, visual, comprising a signal light. Signal device 48 may be mounted, as by two-sided adhesive tape, to the outer surface of tank 5 of the water softener, as shown in FIG. 2; may be affixed directly to housing 47 of the sensor, as shown in FIG. 6; or may be located in a place or room remotely spaced from the water softener. Any suitable power source may be provided for the sensor and its signaling device, as for example a transformer 46, shown in FIG. 1, or a small battery, not shown.

Figure 3:
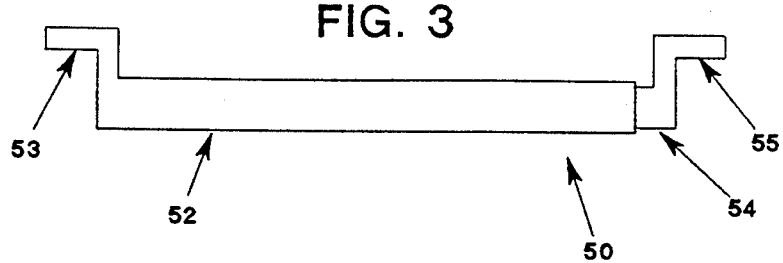
FIG. 3 is a side view of the sensor support bracket of the invention.
Figure 4:
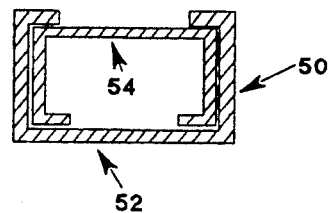
FIG. 4 is a sectional view of the support bracket of FIG. 3.
Figure 5:
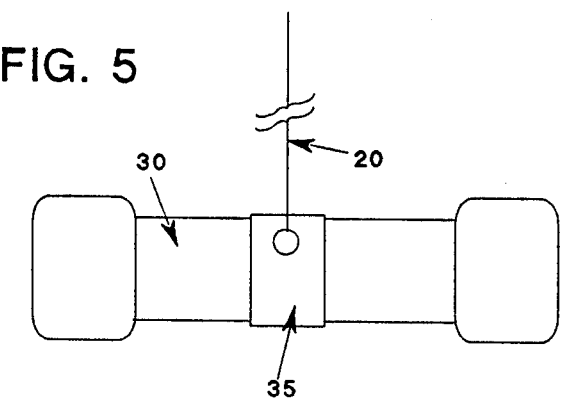
FIG. 5 is a side view of the weight of the present invention showing the line adjustment clip.

For supporting the sensor and the attached drop line, an adjustable bracket, shown to advantage in FIGS. 3 and 4, and designated generally by the numeral 50, may be used. So that the bracket may be used in softeners having tanks 5 of varying diameters, the bracket is constructed of telescoping portions 52 and 54. Portion 52 includes an outer channel member in which portion 54 may be reciprocally moved to a proper overall length. Each of the bracket portions are provided with a shoulder 53 and 55, respectively, for placement upon rim 6 of the water softener tank 5. In this manner, a conventional lid may be placed over the support bracket and mutilation of the softener is not required. Connecting wires running from sensor 40 to signal 48 may be carried by the support bracket. Sensor 40, being mounted to the bracket within tank 5 and below the level of the lid, is therefore not visible, once in place.

In the alternative, an aperture 2 may be drilled through a conventional lid 3, and sensor 40, contained within housing 47, may be mounted on the upper exterior surface of the lid. Drop line 20 is then threaded therethrough and is connect to weight 30, as before described. With this embodiment, the signal device 48 may be affixed directly to housing 47 and the housing may then, in turn, be affixed to the top surface of the lid by adhesive or by any other attachment means desired.

Referring now to FIG. 2, use of the monitoring device 10 of the present invention will be explained. With sensor 40 attached thereto, bracket 50 is adjusted in length and placed over the rim 6 of tank 5 of the softener. Drop line 20, which is connected to sensor 40 is adjusted to a selected length by drawing the line through clip 35 of weight 30 and the weight is placed upon the top surface of salt mass 9, contained within the tank. After repeated cycles of the softener, the salt mass drops to a level whereupon weight 30 does not become fully supported by the salt mass, but rather, tension is applied to drop line to actuate sensor 40, either directly or by means of lever 41 as it pivots upon member 42, as shown in FIG. 1, and as is preferred. Once actuated, sensor 40 causes signal member 48 to give an aural or visual signal, as the case may be, to alert the operator or homeowner that salt is to be added to the tank. The signal is operative until, once again the softener is filled with salt. During the filling process, device 10 is removed and once the salt has been poured in, the device is again put in place. It is to be noted that should brine overflow the salt mass, the weight simply stays in place upon the solid salt mass and sensor 40 is actuated only when the salt level once again reaches a given depth.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A device for monitoring solid salt level within a water softener, comprising:

a drop line;

a weight connected to the lower end of said drop line, said weight having a mass density less than the mass density of solid salt but greater than the mass density of salt brine for sinking through salt brine and resting upon the top surface of the salt being monitored;

a sensor connected to the opposing top end of said drop line, said sensor actuated by tension placed upon said drop line by said weight when said salt level drops below a selected level; and sensor support means mounted on said water softener.

2. The device as described in claim 1 wherein said support means comprises a lid for the water softener, said lid provided with an aperture for stringing said drop line therethrough.

3. The device as described in claim 1 wherein said support means comprises a length adjustable bracket mounted over a top rim of the water softener.

4. The device as described in claim 1 wherein said sensor comprises a microswitch, a lever mounted at one end to said microswitch and at the other end to said drop line; and signal means connected to and actuated by said microswitch.

5. The device as described in claim 1 wherein said weight includes a tubular member, circular in cross section.

6. The device as described in claim 1 wherein said weight is provided with a clip for attachment to said drop line and adjustment of the effective length of said drop line.

* * * * *